United States Patent
Seller

(10) Patent No.: US 9,647,718 B2
(45) Date of Patent: May 9, 2017

(54) WIRELESS COMMUNICATION METHOD

(71) Applicant: Semtech Corporation, Camarillo, CA (US)

(72) Inventor: Olivier Bernard André Seller, Sainte Soulle (FR)

(73) Assignee: Semtech Corporation, Camarillo, CA (US)

(*) Notice: Subject to any disclaimer, the term of this patent is extended or adjusted under 35 U.S.C. 154(b) by 0 days.

(21) Appl. No.: 14/849,288

(22) Filed: Sep. 9, 2015

(65) Prior Publication Data

US 2016/0094269 A1  Mar. 31, 2016

(30) Foreign Application Priority Data

Sep. 30, 2014  (EP) .................................... 14187169

(51) Int. Cl.
| | | |
|---|---|---|
| H04B 1/69 | (2011.01) | |
| H04L 27/22 | (2006.01) | |
| H04B 1/713 | (2011.01) | |
| H04W 72/04 | (2009.01) | |
| H04B 1/692 | (2011.01) | |

(52) U.S. Cl.
CPC ............ *H04B 1/69* (2013.01); *H04B 1/692* (2013.01); *H04B 1/713* (2013.01); *H04L 27/22* (2013.01); *H04W 72/0446* (2013.01); *H04B 2001/6912* (2013.01)

(58) Field of Classification Search
USPC ................................. 375/139, 136, 130, 242
See application file for complete search history.

(56) References Cited

U.S. PATENT DOCUMENTS

| | | | | |
|---|---|---|---|---|
| 6,389,056 | B1* | 5/2002 | Kanterakis | H04B 7/2668 370/342 |
| 2002/0057726 | A1* | 5/2002 | Williams | H04B 1/7101 375/136 |
| 2008/0309543 | A1* | 12/2008 | Schaffner | H04B 1/7183 342/21 |
| 2008/0310481 | A1* | 12/2008 | Schaffner | H04B 1/7183 375/139 |
| 2010/0182993 | A1* | 7/2010 | Jurgensen | H04B 1/7183 370/350 |
| 2014/0362891 | A1* | 12/2014 | Hiscock | H04L 27/103 375/139 |
| 2015/0282068 | A1* | 10/2015 | Rajagopal | H04W 52/0206 370/350 |

* cited by examiner

*Primary Examiner* — Eva Puente
(74) *Attorney, Agent, or Firm* — Blank Rome LLP

(57) ABSTRACT

A wireless communication method between a plurality of end-points by a plurality of base stations, based on frames that have a CSS-modulated preamble followed by a data body modulated at a narrower bandwidth, either by CSS or by a UNB modulation. The system permit to avoid or mitigate collision between packets and to increase the network capacity, maintaining the simplicity of detection inherent of CSS modulation.

10 Claims, 3 Drawing Sheets

WIRELESS COMMUNICATION METHOD

REFERENCE DATA

The present invention claims priority from European Patent Application EP14187169 of 30 Sep. 2014, the contents whereof are hereby incorporated in their entirety.

FIELD OF THE INVENTION

The present invention is directed to a method and a frame for control of a plurality of end-points by a plurality of base stations in wireless networks, particularly, but not exclusively, when the throughput of the network system is a limiting factor and the network adopts a synthesized chirp modulation scheme.

BACKGROUND ART

Digital wireless data transmission is used in a wide variety of systems that present a great variability in both in data rate, transmission range, and power consumption. Spread-spectrum modulation techniques are used to improve the immunity to noise and interferences in radio communication, the various Bluetooth® protocols are examples of such techniques. These modulation schemes use frequency-hopping spread-spectrum and achieve low consumption and good bandwidth, but their range is limited to a few meters.

Direct-sequence spread-spectrum techniques are also known and can reach very high levels of coding gain. In some cases, like in GPS system, have shown excellent noise immunity over long ranges. Limitation of these techniques are however the comparatively high complexity of the receivers, the acquisition times that can be very long for weak signals, and their power consumption.

European patent application EP2449690 describes a communication system using digitally-synthesized chirp symbols as modulation, and a suitable FFT based receiver.

Chirp generation in various kind of radiofrequency circuits is known, for example U.S. Pat. No. 6,549,562 describes a method for generating modulated chirp signal, while EP0952713 shows a synchronization process based on chirp signals.

U.S. Pat. No. 6,940,893 and U.S. Pat. No. 6,614,853, among others, describe generation and use of chirp signal by passing an impulsive signal through a dispersive filter, and communication schemes based thereupon.

Other references known in the art describe a communication system using digitally-synthesized chirp symbols as modulation, and a suitable FFT based receiver. European patent application EP2763321 describes, among others, one such modulation method in which the phase of the signal is essentially contiguous, and the chirps are embedded in data frames in such a way as to allow synchronization between the transmitter and receiver nodes, as well as determining the propagation range between them. This modulation scheme is used in the long-range LoRa™ RF technology of Semtech Corporation, and will be referred simply as 'LoRa' in the following of this document.

The chirp spread spectrum (also CSS in the following) communication systems mentioned above are especially useful in the deployment of network of a large number of end nodes, which to transmit a limited amount of data, with low power and over long ranges. When the number of nodes in the network increases, however, communications can be limited by the maximum available network capacity. There is therefore a possibility and a need on improving on the aggregated capacity of wireless networks based on Chirp Spread Spectrum modulation.

CSS networks and other networking system can implement different strategies to avoid collisions, or at least reduce their likelihood, and thus make better use of the available capacity. It is known for example to use carrier sense or 'listen before send' protocols to obtain this benefit. These systems cannot however exceed the theoretical capacity of the network and impose always a cost in terms of power consumption and battery life compared to straight random access (also known as ALOHA).

Other modulation techniques, collectively designated as Narrow band or Ultra Narrow Band (UNB) modulation are known that transmit data through a number of very low bandwidth channels. These system can attain long transmission distances, and promise to deliver excellent spectral efficiency. CDMA is another known modulation that makes very efficient use available spectrum. Both these techniques, however, require considerable processing power and high quality reference (temperature-compensated) oscillators, which limits their usefulness in low-power, low-cost applications. In some applications, narrow-band or ultra-narrow band transmissions are used with standard oscillators, in uplink. In such cases, however, the random frequency drift of the local oscillator alter the frequency, such that the channel boundaries cannot be precisely defined, the collision probability increases, and network capacity is negatively affected.

Therefore, it is an aim of the present invention to propose means and methods capable of improving the spectral efficiency of existing chirp-spread spectrum networks.

DISCLOSURE OF THE INVENTION

The present invention has been conceived and developed aiming to provide solutions to the above stated objective technical needs, as it will be evidenced in the following description.

In accordance with an embodiment of the present invention is proposed a wireless communication method between a plurality of end-points by a plurality of base stations, as it is the object of the appended claims. In particular, the present invention concerns a wireless communication method between a plurality of end-points by a plurality of base stations, comprising: sending a message by a transmitter including a preamble modulated according to a chirp spread spectrum format, and a body comprising data modulated with a narrower bandwidth than the preamble, the data rates of the preamble and of the body being linked, receiving said message in a receiver, detecting said chirp spread-spectrum preamble aligning a local time reference of the receiver to the time reference of the transmitter by means of said chirp spread-spectrum preamble, and demodulating said body.

More detailed explanations regarding these and other aspects and advantages of the invention are provided herewith in connection with the exemplary embodiments of the present invention.

BRIEF DESCRIPTION OF THE DRAWINGS

The above and other aspects, features and advantages of the present invention will become more apparent from the subsequent description thereof, presented in conjunction with the following drawings, wherein.

MODES FOR CARRYING OUT THE INVENTION

The following description of the presently contemplated best mode of practicing the invention is not to be taken in a limiting sense, but is made merely for the purpose of describing the general principles of the invention. The scope of the invention should be determined with reference to the claims.

Reference will now be made to the drawings wherein like numerals refer to like parts throughout.

The reader is directed to European patent applications EP2449690 and EP2763321 (hereby incorporated by reference) for a detailed description of the LoRa modulation scheme. The present description will simply recall the essential points for brevity.

LoRa modulation is based on a succession of frequency chirps whose frequency changes, along a predetermined time interval, from an initial instantaneous frequency value $f_0$ to a final instantaneous frequency $f_1$. It will be assumed, to simplify the description, that all the chirps have the same duration T, although this is not an absolute requirement for the invention.

The chirps can be described by the time profile f(t) of their instantaneous frequency or also by the function $\phi(t)$ defining the phase of the signal as a function of the time. Importantly, LoRa equipment can generate and recognize chirps having a plurality of different profiles, each corresponding to a symbol in a predetermined modulation alphabet. Importantly, the chirps can be either base chirp (also called unmodulated chirps in the following) that have specific and predefined frequency profile, or one out of a set of possible modulated chirps, obtained from base chirps by time-shifting cyclically the base frequency profile.

In a common implementation, the frequency of a base chirps increases linearly from an initial value $f_0=-BW/2$ at, to a final value $f_1=BW/2$ (in the baseband representation), where BW stands for the amount of bandwidth spreading, but descending chirps or other chip profiles are also possible. The phase of the chirps is preferably described by a continuous function $\phi(t)$, that has the same value at the beginning and at the end of a chirp: $\phi(t_0)=\phi(t_1)$ such that the phase of the signal is continuous across symbol boundaries. This inter-symbol phase continuity enables advantageous and elegant FFT demodulation algorithms.

As mentioned above, the interval $BW=f_1-f_0$ together with the chirp period T define the spreading factor of the LoRa transmission, such that the system is capable of operating at different spreading factor. It is important to note that demodulation of LoRa signals requires the knowledge of the spreading factor and, therefore, this parameter is preferably predetermined by the protocol, transmitted to the receiver node, or algorithmically predictable, in order to avoid long searches. It is possible, and indeed preferred, to impose a common value of BW, such that the spreading factor is univocally determine by T alone.

Figure 1:
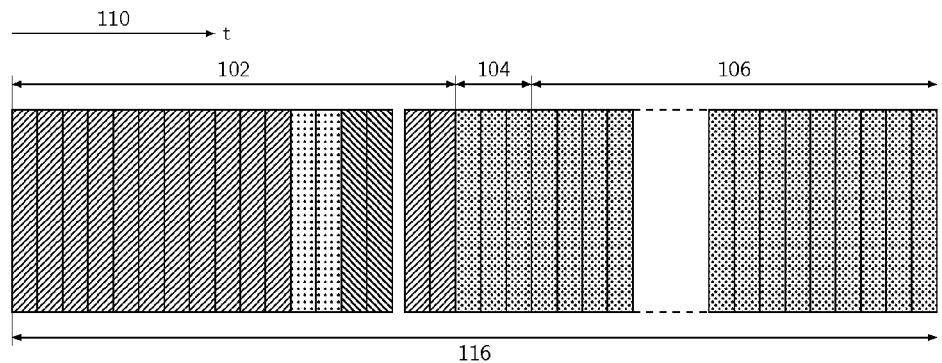
FIG. 1 is a representation of a frame format in a Chirp Spread Spectrum such as proposed in the LoRa protocol.

FIG. 1 represents a typical transmission frame in a LoRa network. Each rectangle represents here a chirp or, equivalently, a symbol: the horizontal axis 110 corresponding to the elapsed time, and the height of the rectangles being an indication of the respective bandwidth of each chirp. It can be observed that all the chirps have a common height and width, corresponding to a common bandwidth and duration.

The frame 116 comprises a preamble 102 that includes a succession of modulated and unmodulated chirps. The preamble enables the instant synchronization in time and frequency of the receiver's time reference with the transmitter's one in the manner explained in patent application EP2763321. It could also, according to the need, be sensibly longer or shorter than what is represented in the figure.

The preamble 102 is preferably followed by a packet header 104 that includes information needed for the decoding of the data payload 106 that follows. The header is represented in the figure by three modulated symbols, but it may include sensibly more and, in fact, its structure could be determined flexibly.

The present invention relates to an improvement of the transmission scheme of FIG. 1 that allows to increase the total capacity of a LoRA CSS network by making more efficient use of the available bandwidth. According to the embodiment represented in FIG. 2 the transmission includes a preamble part as in the conventional LoRa protocol, followed by a series of symbols that encode the header 104 and the payload 106, transmitted as chirps modulated with a lower bandwidth and a lower spreading factor. In the represented example, the data section is modulated with a bandwidth that is $\frac{1}{8}^{th}$ of that of the preamble, which generates eight frequency sub-channels. Other spreading rations are also possible, however.

Preferably, as represented, the data is transmitted on a plurality of sub-channels by a frequency hopping scheme, for example changing the sub-channel at each symbol boundary according to an algorithmically predictable pseudorandom series, or by another suitable variant.

Figure 2:
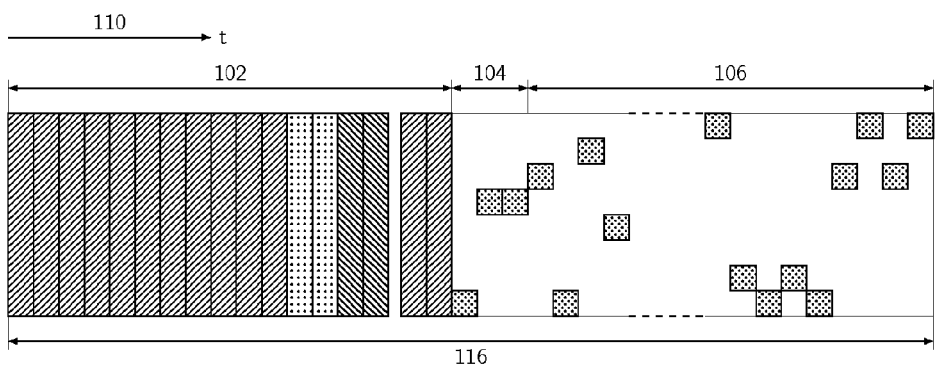
FIG. 2 represents schematically a frame encoding the same content as that in FIG. 1 according to one aspect of the present invention.

Since the detection and synchronization rely on the preamble that is unchanged, these tasks are as simple as in the conventional LoRa CSS modulation and, in particular, endpoint can receive without prior synchronization and using standard crystal oscillators. The schema of FIG. 2 provides however some important advantages, namely:

Since the data uses less bandwidth, more frequencies are available

The collective capacity of the network is increased because the data section, which make the most of the traffic, are encoded with a lower bandwidth, hence with a higher spectral efficiency;

Insofar as spreading factor and bandwidth are reduced in the same proportion, data rate and sensitivity do not change.

The system is compatible with legacy equipment that utilizes only the full bandwidth.

Different spreading factors are 'orthogonal' in the sense that they appear as noise to modems set for decoding data having a different spreading factor. Simultaneous signals having different SR can be received without errors as long as the Signal/Interference ratio is sufficiently high.

Capacity is increased for both uplink and downlink.

The new modulation scheme can be carried out with minor modification to existing CSS modems.

Fine time stamping of frames, using the preamble section allows positioning the end points very accurately. Since the preamble occupies a relatively high bandwidth, position accuracy is affected, as it would have been by a narrower bandwidth.

Although FIG. 2 represents header 104 and payload 106 symbols as having the same time duration as those in the preamble 102, it should be noted that this is not an essential feature of the invention, and that the symbol in the header and payload could be longer or, preferably, shorter, than those in the preamble. It could be conceivable, for example, to use half-length symbols in header 104 and/or in payload 106 and full-length symbols in the preamble, when the condition allow it, in order to increase the data rate.

The bandwidth reduction ratio between the symbol of the preamble 102 and those of the header 104 and of the payload 106 is preferably chosen higher than the corresponding ratio of symbol durations, such that the slope of the frequency chirps during the header and payload is lower than in the preamble. Low-slope chirps modulated can be generated by polar synthesizers, for example.

An embodiment of the present invention relates to communication in a wireless network comprising at least one base station, typically connected to a larger network, or to the internet and a plurality of end nodes that transmit data to the base station or stations. One example of this configuration could be a wireless network of simple autonomous devices, each equipped with a battery or a similar energy supply, scattered in an area and communicating with the closest base station in range. It is customary, borrowing the vocabulary of GSM and cellular telephone networks, to denote the communication from the end note to the base station as 'uplink', while the reverse link, from base station to the end node is referred to as a 'downlink'.

In an embodiment of the present invention the end nodes can communicate according to one out of a plurality of possible spreading factors for the uplink, according to the needs and the quality of the channel. Preferably all endpoints use single bandwidth ratio and a common hopping sequence in a given network and for a given spreading factor. The base station knows or can reconstruct this sequence, and starts frequency-hopping right after detection and synchronization. This technique can provide capacity increase for several spreading factors. Preferably, each spreading factor only uses a single bandwidth ratio and a single hopping sequence.

In transmission, the endpoint can modulate the signal according to the stated hopping sequence using essential the same modulator hardware as the conventional LoRa system. At the receiving side, in the base station, the detection and synchronization are performed in the preamble as usual. Preferably, the base station dispose of two distinct demodulation means, one for legacy signals, having constant spreading factor, and one for the increased capacity described by FIG. 2. According to another preferred feature, the base station, upon detection of a valid narrow-band CSS signal generates also a full-band signal from which the narrow-band signal has been subtracted/rejected. In this way several transmissions can be demodulated at the same time.

Importantly, this embodiment allows dealing with most collision cases with no or minimal data loss:

Preamble interfering with a reduced bandwidth payload: thanks to the orthogonality of the different spreading factors, (different time-frequency slopes) these signals can be demodulated concurrently, just like conventional CSS signal of different spreading factor.

Reduced bandwidth payload interfering with a successive preamble: the reduced bandwidth signal is known and can be subtracted from the preamble in the base station. In this case, the sensitivity loss can be exceedingly small.

Two reduced bandwidth signal interfering with one another. In this case, the hopping sequences are shifted and collisions do not occur, or do so with statistically low probability (around 1/BW ratio).

Preamble/preamble are the only one directly harmful collisions are those between preambles. In this case, the interference prevents the detection and synchronization for at least one of the two colliding signals, or both. This can be mitigated by specially designed receivers having several parallel preamble detectors (energy accumulation based), which allows in most cases concurrent detection when the time offset is sufficient.

In typical cases, the preamble is about 10 symbol long while the whole frame length can vary between 18 and 200 symbols. Even accepting to drop frames in which preamble-preamble collision occurs, the probability of such an error depends now on preamble length and not on the length of the whole frame, and the invention improves the collision ratio by a factor between 2 and 20.

Figure 3:
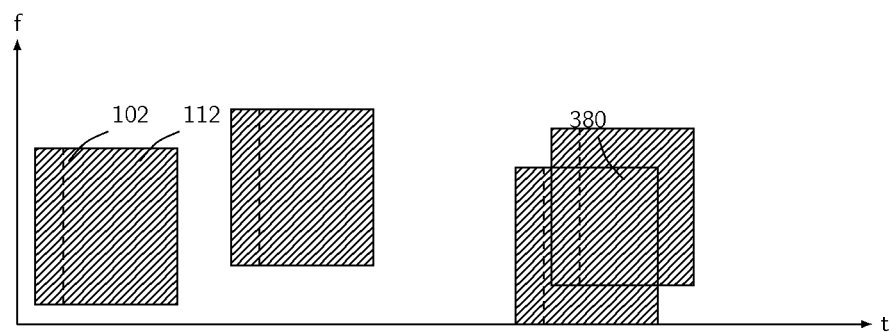
FIGS. 3, 4, and 5 illustrate collisions in the LoRa protocol, respectively according to an embodiment of the invention and in narrow-band or ultra-narrow band (UNB) modulation.
Figure 4:
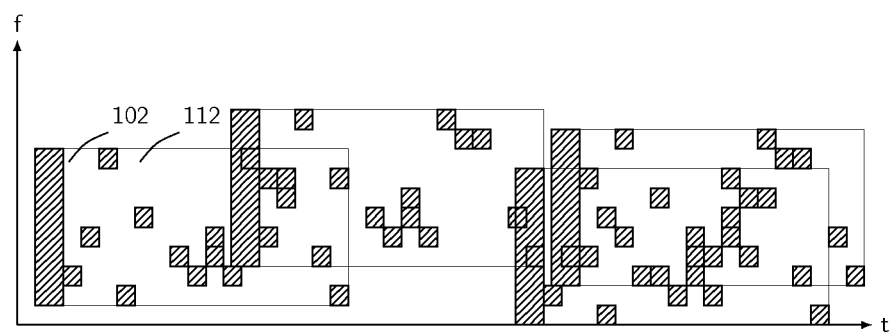

FIGS. 3 and 4 exemplify the advantages in network capacity procured by this embodiment of the invention. FIG. 3 is relative to the standard LoRa modulation by which all the frames are transmitted with uniform bandwidth. Four frames are represented, each comprising one preamble 102 and a header plus payload 112. It is apparent that the third and last frames are colliding (region 380) and cannot be demodulated.

FIG. 4 shows the same situation with four frames starting at the same times and on the same frequencies as in FIG. 3. No collision occurs between the payloads, despite the fact that they have purposely been represented longer than in FIG. 3, and the overlaps between narrowband payload symbols and broadband preamble chirps are not collision, thanks to the orthogonality of different bandwidths.

This technique can also be applied to the downlink message. Should the base station send an acknowledgement or a message to the end node, this can be modulated in the same narrow-band format and continuing the frequency-hopping sequence of the uplink frame. Preferably, the base station will align the chirps in the downlink message in time and frequency with the time reference of the end node to which they are destined, such that they can be transmitted directly without a preamble synchronization sequence. This further reduces the spectral occupation of downlink messages.

The technique also allows stacking different users in different frequency sub-channels in FDMA fashion, rather than having all the end nodes sharing all the sub-channels. This variant is particularly interesting for low and intermediate spreading factors.

When users require to be addressed with the full power of a base station, users stacking is not practicable. Instead, a variant of the invention increases the capacity by allowing close-by base station to coexist on the same spreading factor, at the same time, without collisions.

To achieve this, base stations needs to be synchronized in time to better than 1/bandwidth. This is to ensure preambles are received aligned to the sample by users. Then each base stations, after transmitting the preamble, switches to a hopping sequence which is not used by close-by stations.

Time cyclic shifts of a base hopping sequence is a good way to generate a set of sequences. Then hopping sequences can be planned across the network. A base station can be allocated several sequences, in case it can split its power among several users. If bandwidth ratio is chosen to be 128, then 128 orthogonal hopping sequences can be build, meaning an overall increase of capacity of up to 128× at the network level. Again, this increase in capacity is only for the highest spreading factors. Alternatively, random hopping sequences can be assigned to base stations, which avoids network planning but costs some capacity.

According to another embodiment of the present invention, now presented with reference to FIGS. 5 to 8, the frames are started by a chirp-modulated preamble, followed by header and payload modulated with a narrower bandwidth than the preamble, by means of an ultra-narrow band modulation.

It the context of the present invention, 'Narrow-Band' and 'Ultra-Narrow Band' designate a digital modulation technique that does not deliberately spread the bandwidth of the generated signal. It may include, among others, Frequency Shift Keying (FSK, GFSK, . . . ), Phase Shift Keying (PSK, BPSK, QPSK, . . . ), Minimum Shift Keying (MSK), Amplitude shift keying (ASK, QAM, APSK, OOK), Continuous Phase modulation (CPM).

Individual narrow-band transmission, irrespective of their modulation, have spectral efficiency, including coding gain, in the range between 0.25 and 1.5 bits/s/Hz. Assuming channel access method for wireless (or other shared channel) transmission that allows uncoordinated users to share a common transmission resource, such as random channel access (ALOHA), both in the time and frequency domain, the achievable efficiency is between 5% and 10%, depending of the acceptable collision ratio. In a 125 KHz channel, this translates to an aggregated throughput of around 4 Kbps.

Figure 5:
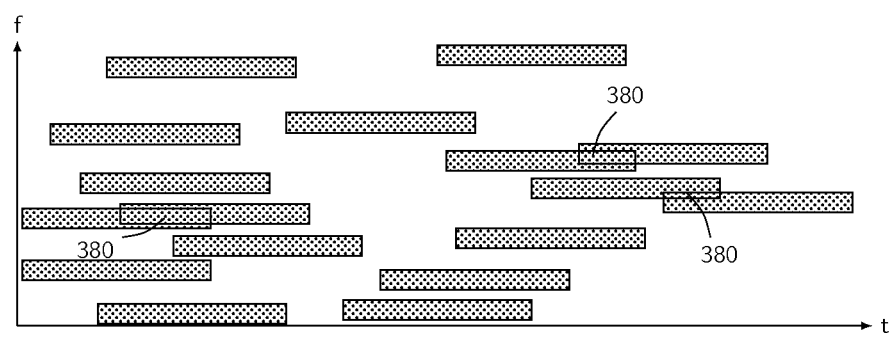

FIGS. 3 and 5 illustrate the collisions and capacity difference between regular CSS and narrow-band modulation. For sake of simplicity, it may be assumed that each rectangle, both above and below carries the same amount of data. In comparison with the situation of FIG. 3, collisions still occur in FIG. 5, as indicated by overlapping areas 380, yet the larger network capacity of the narrow-band modulation is apparent. A drawback of narrow-band transmissions, however, is that they are relatively hard to detect and demodulate, particularly in comparison with CSS signals that can is easily detected and received by endpoints. The difficulty of detecting UNB signals is especially problematic in downlink, given the simple hardware of the end nodes. Also narrow-band base-stations are much more complex than their typical CSS counterparts.

Narrow-band transmission is especially effective in network having very large cells, with many endpoints needing the maximum link margin. In such a cell, the LoRa CSS technique would also bring the same or better coverage, but with limited cell capacity. CSS transmission is best suited for small cells, where most of the endpoints use high data rate: this saves endpoints power, and even though the capacity is still lower than narrow-band, the cost of base stations is also lower, so more such base stations can be deployed in a given cost envelope.

The present invention proposes a technique that employs both these technologies in combination for data transmission in low throughput networks.

In accordance with the present invention, a transmission comprises a preamble modulated according to chirp spread spectrum (CSS). Such preambles can be easily and reliably detected in the designated receivers and, as side effect, allow time and frequency synchronization between the sender and the receiver. The payload, or body 312, on the other hand, is made of a narrow-band signal, or of a plurality of narrow-band signals in separate frequency sub-channels, the former being preferably used for uplinks, and the latter for downlink and multicast messages. This combination allies the simple detection hardware afforded by the CSS and the large cell coverage of the UNB networks.

Further advantageously: the collision probability on uplink is reduced, since only the preambles have a significant chance of colliding. Since the preambles are at maximum ½ of the frame, and down to 1/10 of a frame or lower, the collision probability is reduced by a factor of 2 to 10 and the capacity is accordingly increased.

On the downlink, the capacity is increased even more, since all UNB channels can potentially be used in parallel. This is especially advantageous since downlink capacity is limited by base station transmit duty cycle, such that while broadcast may not be a problem with CSS, unicast transmission is.

The use of CSS solves a synchronization problem between endpoint and base station. In a possible implementation, the endpoint selects a narrow-band channel, with its own frequency reference. The channel is referenced to the center frequency of the chirp symbols. For downlink, the base station does the same, using for this device the same narrow-band channel. Upon reception of a downlink, the endpoint synchronizes to the center of the chirp symbol, so it can receive its channel even if its own crystal has drifted. This allows the use of inexpensive crystal oscillators, in contrast with most narrow-band receiver that need TCXO time references.

In another possible implementation, the endpoint synchronizes to a downlink transmission then selects a narrow-band channel for its uplink transmission. The uplink transmission does not require a CSS preamble, an UNB preamble can be used. Being synchronized to the downlink, UNB channels can be defined without overlap.

The combined use of CSS and narrow-band formats in a frame does not render the traffic free of collisions, as several endpoints in a cell may pick up the same narrow-band channel. However there are much more such channels than CSS ones, therefore the overall capacity is increased. As with CSS, narrow-band, and any radio system, the messages comprise a header signaling for whom the message is intended to.

Figure 6:
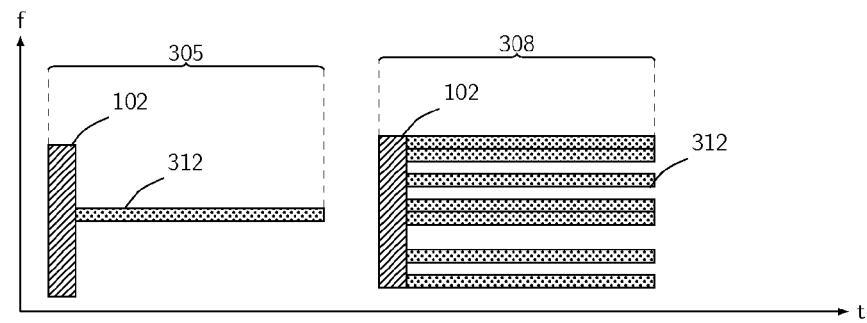
FIG. 6 illustrates an exchange of information between a base station and an end node combining chirp spread spectrum and ultra-narrow band technologies, for uplink and downlink, in accordance with the present invention.

FIG. 6 illustrates the structure of an uplink message 305 transmitted by an end node to a base station with a combination of chirp spread spectrum and narrow-band technologies, in accordance with the present invention.

As it may be noted from the figure, the message includes a preamble 102 modulated in chirp spread spectrum (CSS). The body 312 of the message, on the other hand, is modulated according to an narrow-band format. The chip spread spectrum preamble is simple to detect in the receiver, and data rates of the preamble 102 and of the body 312 are linked, which simplifies the task of finding the ultra-narrow band signals, while retaining their advantages in term of capacity.

It is of note that in uplink, the endpoint may use more than one narrow-band channel, to increase the data rate, or generate a modulated signal with a larger bandwidth, spanning over several adjacent narrow-band channels, to the same purpose. The second variant may be preferable in that it preserves the constant envelope property.

FIG. 6 also illustrates, on the right side, a downlink message 308 that is transmitted from the base station to one or several end nodes, in accordance with the present invention.

As discussed above in connection with the downlink message 305 the message has a CSS-modulated preamble is maintained. The transmission can be unicast, or multicast, and include a CSS preamble followed by a body made by a narrow-band signal on narrow-band channels. It is of note that in this case, adjacent narrow-band channels do not overlap, because they are synchronized in frequency, coming from the same transmitter. This reduces the collision rate. In regular narrow-band transmissions, as endpoints are not synchronized, even in downlink, channels can overlap.

Figure 7:
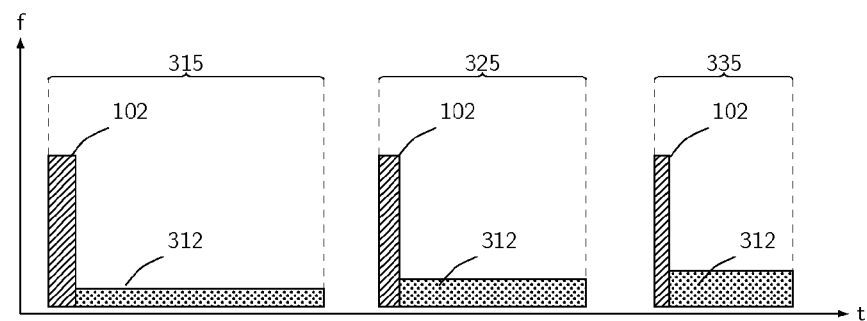
FIG. 7 represents a possible scheme of system link rate adaptation.

FIG. 7 is a schematic representation of a system link rate adaptation.

As it may be seen from the figure, the system is able to adapt its link rate. This is something which is not easily possible in narrow-band, as it increases further the searching space. Here, as already mentioned, the rate of both CSS and narrow-band transmission are linked, and the search is much simplified. As it may be seen in the figure, the higher the spreading factor, the greater number of narrow-band channels are available, thus the greater gain brought by the solution proposed by the present invention. Further, in accordance with the solution proposed by the present invention, capacity improvement may be as well realized.

Figure 8:
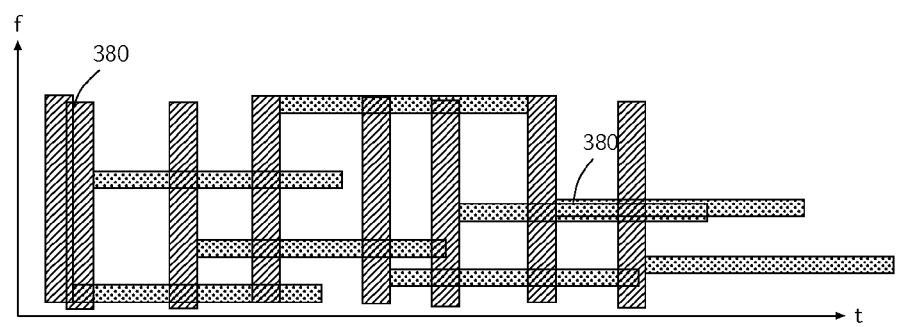
FIG. 8 shows how messages can overlap in time without colliding.

FIG. 8 is the illustration of collision reduction realized with the means proposed by this embodiment of the invention, as packets can overlap in time without colliding.

As it may as well be seen from the figure, with the means and solution proposed by the present invention, packets can overlap in time without colliding. On the downlink, there are no collisions as such, since the base station masters all transmissions. The only exception 380 occurs when the CSS preambles collide, or when two devices choose the same narrow-band channel at the same time. Occurrences can be addressed by the base station that can choose which device to transmit to, or send a message to move this endpoint on another UNB channel. On the downlink, the available power has to be shared among parallel transmissions. As such, it is preferable to adjust the amount of power transmitted for each narrow-band channel i.e. each endpoint.

To summarize, the present invention also proposes a method of wireless transmission that combines a CSS preamble and a narrow-band body message, the data rates of the preamble and that of the body being related to one another, such that the task of searching and finding the narrow-band signal is greatly simplified. This reduces the computational load at the receiver, A further advantage is that the wireless network using this mixed modulation can implementing rate adaptation schemes without increasing the volume of the search space.

Although the foregoing descriptions of certain preferred embodiments of the present invention have shown, described and pointed out some fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions.

The invention claimed is:

1. A wireless communication method between a plurality of end-points by a plurality of base stations, comprising:
    sending a message by a transmitter including a preamble modulated according to a chirp spread spectrum format, and a body comprising data modulated with a narrower bandwidth than the preamble,
    receiving said message in a receiver,
    detecting said chirp spread-spectrum preamble,
    aligning a local time reference of the receiver to the time reference of the transmitter by means of said chirp spread-spectrum preamble,
    finding the narrower bandwidth body, based on a data rate of the preamble, and
    demodulating said body.

2. The method of claim 1, wherein said body is modulated by chirp spread spectrum modulation with a spreading factor lower than the preamble.

3. The method of claim 2, wherein said body occupies a plurality of frequency sub-channels according to a frequency hopping scheme.

4. The method of claim 3, in a network comprising a plurality of nodes, the frequency hopping scheme being common to all nodes.

5. The method of claim 2, in a network with a plurality of nodes, comprising a step of assigning different sub-channels to different nodes.

6. The method of claim 3, in a network comprising a plurality of base stations, with time-synchronized transmissions, preambles being transmitted simultaneously, comprising a step assigning different sub-channels to different base stations.

7. The method of claim 1 wherein said body is modulated in narrow-band modulation.

8. The method of claim 6, wherein said body 312 consists of one narrow-band signal in one narrow-band sub-channel, if it be a uplink message, or of a plurality of narrow-band signals in separate frequency sub-channels if it be a downlink and/or multicast message.

9. The method of claim 6, comprising adapting a data rate for the narrow-band modulated body 312.

10. A wireless communication method between a plurality of end-points by a plurality of base stations, comprising:
    sending a message by a transmitter including a preamble and a body modulated according to a chirp spread spectrum format
    receiving said message in a receiver,
    detecting said chirp spread-spectrum preamble,
    aligning a local time reference of the receiver to the time reference of the transmitter by means of said chirp spread-spectrum preamble,
    demodulating said body,
    selecting a narrow-band channel having a narrower bandwidth than the preamble, and
    replying to the transmitter with an uplink message in said narrow-band channel.

* * * * *